Figure 1:
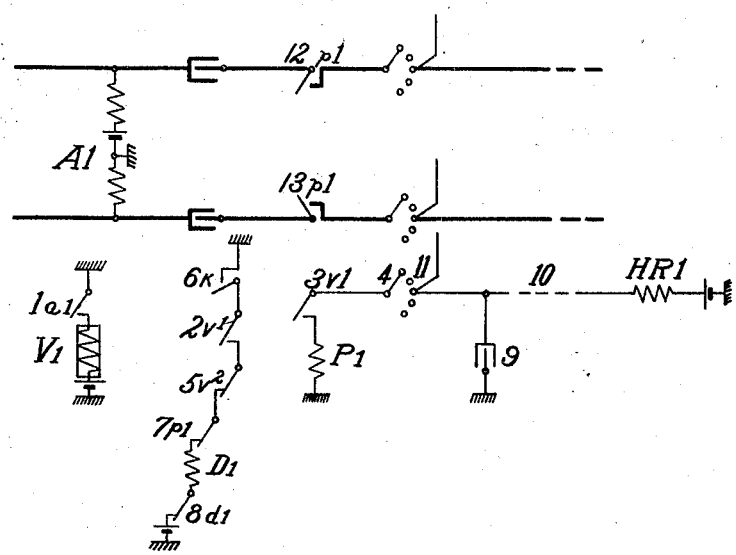

March 8, 1927.

A. FLAD 1,620,090

TELEPHONE SYSTEM

Filed April 23, 1926

Inventor
Arthur Flad
R. C. Richardson Atty.

Patented Mar. 8, 1927.

1,620,090

UNITED STATES PATENT OFFICE.

ARTUR FLAD, OF BERLIN, GERMANY, ASSIGNOR TO SIEMENS & HALSKE, AKTIEN-GESELLSCHAFT, WERNERWERK, OF SIEMENSSTADT, NEAR BERLIN, GERMANY.

TELEPHONE SYSTEM.

Application filed April 23, 1926, Serial No. 104,022, and in Germany June 27, 1925.

The present invention relates to a circuit arrangement for testing lines, especially in telephone systems, and it consists in that, when the test relay is connected to the line to be tested it is caused to operate by the charging or discharging current of a capacity.

The arrangement according to the invention has important advantages over the known arrangements for testing the lines. For example, it enables the test relay to operate with the required speed even when the lines to be tested are of such length that their electrical properties considerably extend the time taken for the test relay to attract its armature in the known arrangement.

The drawing shows several methods of carrying out the invention.

Figure 2:
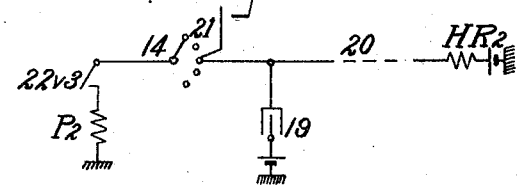
Figure 3:
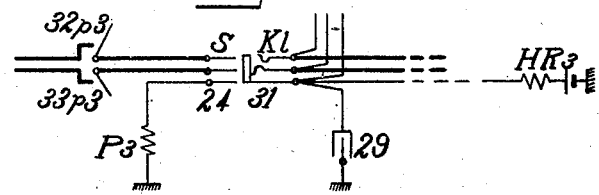

The Figures 1 and 2 show arrangements for systems with automatic operating, and Figure 3 shows an arrangement with manual working.

In the example shown in the Figure 1, a group selector is indicated. It is presumed to be a Strowger switch of known type, but only those parts are shown that are required for understanding the invention, these comprise the impulse receiving relay $A^1$, which is under the control of the calling party, the releasing relay $V^1$, as well as the circuit of the rotary magnet $D^1$ and the testing relay $P^1$.

When the switch is taken into use, the impulse relay $A^1$ is energized in the microphone circuit of the calling party, and at its contact $1a^1$ connects up the slow releasing release relay $V^1$. The latter, among other circuit changes, closes its contacts $2v^1$ and $3v^1$, thereby on the one hand preparing the circuit for the rotary magnet $D^1$ and on the other hand connecting the test relay $P^1$ to the test wiper 4. The circuit of the rotary magnet $D^1$ can in known manner be closed only when a not shown steering relay has fallen back and has closed its contact $5v^2$ at the end of the train of impulses for lifting the group selector to the required level, during which train of impulses the steering relay is energized. The circuit for the rotary magnet $D^1$ is then closed as follows: earth, off normal contact $6^k$, contacts $2v^1$, $5v^2$, $7p^1$, rotary magnet $D^1$, self interrupting contact $8d^1$, battery, earth. The switch is moved step by step over the contacts in the selected level, and it is arrested in the manner hereafter described when the test wiper 4 reaches the test contact of an idle line.

Each line to be tested has a condenser, such as condenser 9, connected to its test lead. If a line is idle the condenser is charged in a circuit such as the following: earth, battery, relay $HR^1$, test lead 10, condenser 9, earth. When the test wiper 4 reaches the test contact of an idle line, which may be assumed to be the line shown in Fig. 1, the condenser 9 of this line is discharged over the following route: condenser 9, test contact 11, test wiper 4, contact $3v^1$, relay $P^1$, earth. This discharge current causes the relay $P^1$ to operate quickly and it then locks itself over a part of the charging circuit for the condenser: earth, battery, relay $HR^1$, test lead 10, test contact 11, test wiper 4, contact $3v^1$, relay $P^1$, earth. When the discharge circuit is closed, the relay $P^1$ operates immediately, at the contact $7p^1$ it opens the circuit of the rotary magnet $D^1$ and among other circuit changes it switches through the speaking leads at the contacts $12p^1$ and $13p^1$.

After the condenser 9 has been discharged, it is slightly charged again, over the charging circuit; but by suitably adjusting the resistances of the relay $HR^1$ and of the test relay $P^1$ and the corresponding relays of all other lines, the discharge current is prevented from attaining a magnitude sufficient to operate the test relay of a testing switch when the switch reaches the test contact of an engaged line. Thus the seized line is marked Engaged without requiring the switch, which has been marked Engaged, to perform special switching operations, such as short circuiting a winding. It should also be mentioned that it would be impossible for the test relay $P^1$ to be operated over the test lead 10 and the relay $HR^1$ without the condenser discharge, but that the test relay can keep its armature attracted over this circuit after it has been energized.

Fig. 2 shows an arrangement, in which the test relay is caused to be operated by the current that charges a capacity. The condenser 19 is connected to the same potential (battery) as the relay $HR^2$ located in the test lead 20. Thus the condenser is discharged. When the test wiper 14 of a testing switch now reaches the test contact 21, the following charging circuit is then closed: earth, test relay P², contact 22v³, which corresponds to the contact 3v¹ in Fig. 1, test wiper 14, contact 21, condenser 19, battery, earth. This charging current causes the relay P² to operate at once, and it then locks itself over the test lead 20 and the relay HR².

When the test wiper of a hunting switch reaches the test contact of an engaged line, the test relay of that switch, similar to relay P² cannot be energized because a charging current cannot become sufficiently large to energize the relay.

The Figure 3 shows how the arrangement shown in Figure 1 can be applied to a manual system. After the plug S has been inserted into the jack J¹, the relay P³ can only operate when the line, which is connected to the plugged jack, is free. In that case the condenser 29 is charged and a strong discharge current functions over the following route: earth, relay P³, plug contact 24, bush 31 of the jack, condenser 29. Thereupon the relay P³ closes both the contacts 32p³ and 33p³, thus switching through the speaking leads. If the plug is inserted into the jack of an engaged line, the relay P³ cannot operate, because a discharge current of the required magnitude cannot pass.

In the examples shown, the test relays P¹, P² and P³ are provided only with one winding. It is obvious that the arrangement can be such that the test relay has two windings connected in series, of these a high resistance winding is short circuited when the relay is operated.

What is claimed is:

1. In a telephone system, a trunk line, a condenser connected to the test conductor of said trunk line, a circuit for charging said condenser, and a test relay initially energized in series with said condenser and maintained energized thereafter over a section of said charging circuit.

2. In a telephone system, an automatic switch, trunk lines terminating in the banks of said switch, a condenser connected to the test contact of each trunk line, a circuit for each line for charging the associated condenser, each trunk line being marked Idle or Busy depending upon the charged or discharged condition of its associated condenser, and a test relay in said switch energized in series with the associated condenser of a line when said switch is operated to connect with an idle line, said condenser being discharged thereby to mark said trunk line busy.

3. In a telephone system, a trunk line, a condenser connected to the test conductor of said trunk, means for charging said condenser to a certain potential to mark said trunk line idle, and means for reducing said potential to mark said trunk line busy.

4. In a telephone system, a trunk line, a condenser associated with said trunk line, means for charging said condenser to mark said trunk line idle, and means for reducing the charge on said condenser to mark said trunk line busy.

5. In a telephone system, an automatic switch, a trunk line, a condenser connected to the test conductor of said trunk line, a charging circuit for said condenser, said trunk line being marked Busy or Idle depending on the potential to which said condenser is charged, a test relay, means for connecting said test relay to said test conductor, said relay thereupon actuating or remaining deactuated depending upon whether said line is idle or busy, said relay being maintained energized thereafter over a section of said charging circuit and the potential to which said condenser is charged being changed to mark said trunk line busy providing said relay is actuated.

6. In a telephone system, a trunk line, a test relay, means for connecting said relay to the near end of the test conductor of said trunk line, a source of current at the far end of said test conductor, and a condenser connected to the near end of said test conductor for storing energy and for facilitating the quick operation of said test relay when it is connected to said test conductor.

In witness whereof, I hereunto subscribe my name this 31st day of March, A. D. 1926.

ARTUR FLAD.